United States Patent
O'Connor

(10) Patent No.: US 8,510,518 B2
(45) Date of Patent: Aug. 13, 2013

(54) BANDWIDTH ADAPTIVE MEMORY COMPRESSION

(75) Inventor: James Michael O'Connor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 605 days.

(21) Appl. No.: 12/820,300

(22) Filed: Jun. 22, 2010

(65) Prior Publication Data
US 2011/0314231 A1      Dec. 22, 2011

(51) Int. Cl.
*G06F 12/00*       (2006.01)
(52) U.S. Cl.
USPC ........................................................ 711/154
(58) Field of Classification Search
None
See application file for complete search history.

(56) References Cited

U.S. PATENT DOCUMENTS

| | | | | |
|---|---|---|---|---|
| 5,961,617 | A * | 10/1999 | Tsang | 710/100 |
| 6,618,831 | B2 | 9/2003 | Lippincott | |
| 2004/0098545 | A1 | 5/2004 | Pline et al. | |
| 2006/0271761 | A1* | 11/2006 | Riemens | 711/212 |
| 2007/0226428 | A1 | 9/2007 | Tremaine et al. | |

OTHER PUBLICATIONS

International Search Report and Written Opinion for App. No. PCT/US2011/041268, mailed Sep. 14, 2011, 7 pages.

* cited by examiner

*Primary Examiner* — Brian Peugh
(74) *Attorney, Agent, or Firm* — Abel Law Group, LLP

(57) ABSTRACT

Data is retrieved from system memory in compressed mode if a determination is made that the memory bus is bandwidth limited and in uncompressed mode if the memory bus is not bandwidth limited. Determination of the existence of the bandwidth limited condition may be based on memory bus utilization or according to a depth of a queue of memory access requests.

21 Claims, 2 Drawing Sheets

BANDWIDTH ADAPTIVE MEMORY COMPRESSION

BACKGROUND

1. Field of the Invention

This invention relates to computer memory and bandwidth utilization associated with the memory.

2. Description of the Related Art

One typical goal of main memory compression schemes is to reduce the bandwidth requirements of off-chip accesses to main memory. In any such scheme, the memory controller needs to know for a given data request whether it must read the full size of the block, or a reduced size if the block is compressed.

There are a variety of memory compression approaches. Many schemes use potentially large on-chip data structures to store (or cache) the "compressed or not compressed" state of various main memory blocks. These on-chip structures are queried before a main memory access to determine whether the full or reduced memory request size should be used. This requires large on-chip structures if a large amount of memory is to be compressible.

Another solution is to encode the compressed/uncompressed state of a block in the main memory itself along with the data in question. For example, either an additional data bit may be provided to encode the state, or the data may be tagged by inverting the ECC bits. First the data is accessed assuming it is compressed, and if the data returned indicates that it is not compressed, the remainder of the data is accessed. This approach results in poor latency for access to uncompressed data, as it requires a memory request to wait for the first (presumed compressed) data to return before issuing a second request.

SUMMARY OF THE PREFERRED EMBODIMENTS

Accordingly, in an embodiment of the invention, a method is provided that includes retrieving data from memory in one of a compressed access mode and a full access mode according to whether a bandwidth limited condition exists in accessing the memory. Determination of the existence of the bandwidth limited condition may be based, e.g., on memory bus utilization or according to a depth of a queue of memory access requests.

In another embodiment, an apparatus includes bandwidth limited determination logic responsive to one or more memory system conditions to determine whether a bandwidth limited operating condition exists and to supply an indication thereof. Memory access control logic is responsive to the bandwidth limited determination logic to retrieve data from the memory in compressed mode when the bandwidth limited operating condition is determined to exist by the bandwidth determination logic and to retrieve data from the memory in full access mode when the bandwidth limited operating condition is determined not to exist by the bandwidth determination logic. In compressed mode, data is retrieved by initially accessing a reduced-size block of data for each block of data requested. If this initial reduced-size block does not contain the compressed data for the full-size block, a second reduced-size block of data is requested, where the first and second requests taken together result in a full-size block of data. In full access mode, a full-size block of data is retrieved for each block of data requested.

In another embodiment, a method is provided that includes determining whether a memory system is operating in a bandwidth limited mode. Responsive to the memory system operating in the bandwidth limited mode, the memory controller accesses data from memory in a compressed access mode. Responsive to the memory system not operating in the bandwidth limited mode, the memory controller accesses data from memory in uncompressed mode.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
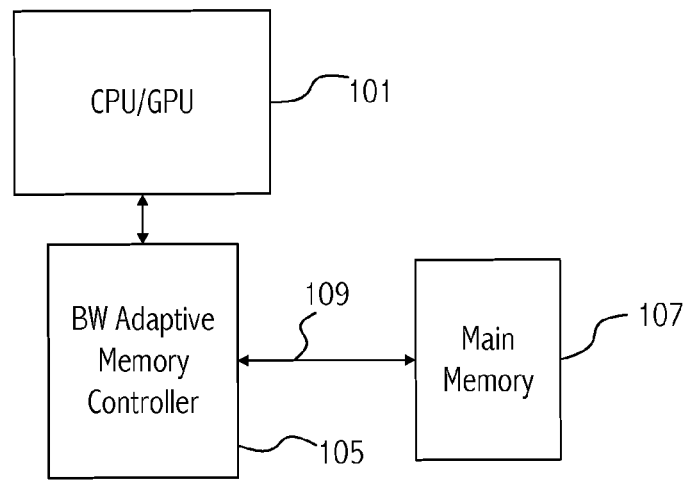
FIG. 1 illustrates a block diagram of a system incorporating a bandwidth adaptive memory controller according to an embodiment of the invention.

Referring to FIG. 1, illustrated is a block diagram of a computer system incorporating an embodiment of the invention. The computer system includes a processor such as, for example, a central processing unit (CPU) and/or graphics processing unit (GPU) 101. The system includes a bandwidth adaptive memory controller 105 and a memory 107. In operating conditions, when the memory request rate is low enough so that there is plenty of available memory bandwidth, saving bandwidth using main memory compression will have minimal performance benefit. Also, in operating conditions when the main memory request rate is high enough to be limited by memory bandwidth, the latency experienced by the memory requests is also quite high (due to queuing delays). In alternative embodiments, the processor (illustrated in the exemplary embodiment as a CPU and/or GPU) may be embodied in other processors such as digital signal processors, microcontrollers and the like. The computer system of FIG. 1 may be embodied in a handheld device, PDA, notebook, desktop computer, server or any other system requiring a processor and memory.

Accordingly, an embodiment encodes the compressed/uncompressed state of a block in the main memory itself along with the data in question. The encoding can be accomplished, e.g., with an additional data bit, or the data may be tagged as compressed by inverting the ECC bits or by some other appropriate mechanism. When the memory controller detects that it is not in a bandwidth limited operating regime, it always accesses the full, uncompressed size of the data. Thus, the latency for accessing compressed or uncompressed data is virtually identical. If, on the other hand, the memory controller detects it is in a bandwidth constrained mode, it will first access the data assuming it is compressed; and if the data returned indicates that it is not compressed, the remainder of the data is accessed. That approach results in increased latency for access to uncompressed data, but saves bandwidth in the case of the data being compressed. That additional bandwidth is available for other requests, potentially reducing queuing delay so the overall latency impact may be mitigated. Increasing the effective bandwidth of the memory controller in bandwidth limited cases should yield a great majority of the performance benefits that come from main memory compression.

Figure 2:
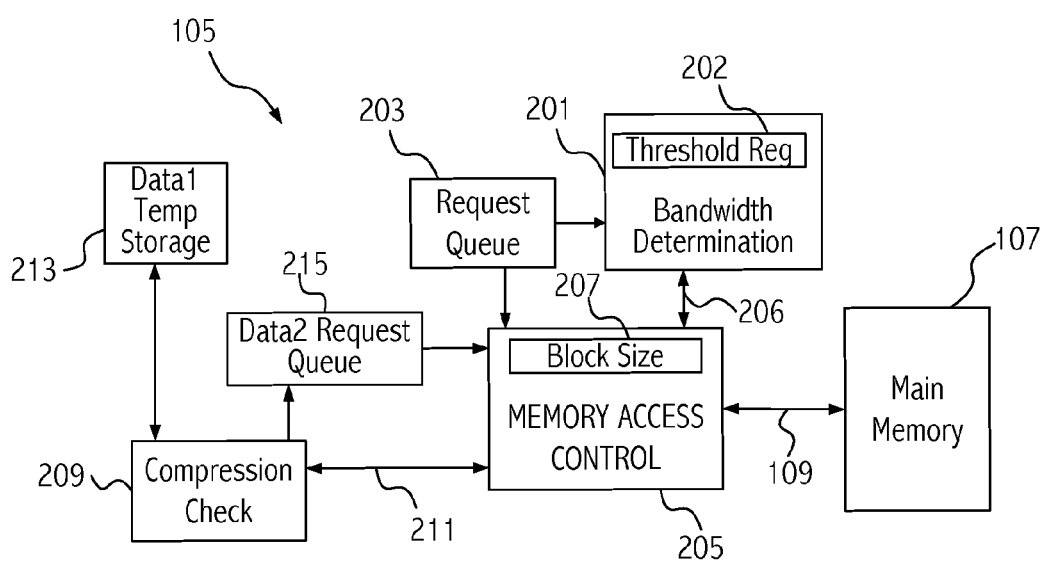
FIG. 2 illustrates an exemplary high-level block diagram of portions of the bandwidth adaptive memory controller of FIG. 1.

Referring to FIG. 2, a block diagram of portions of the bandwidth limited memory controller is shown. The memory controller needs to determine whether the memory bus 109 is bandwidth limited and uses bandwidth determination logic 201. In one embodiment, bandwidth determination logic 201 monitors usage of the memory bus and detects when the memory bus is in use less than a configurable fraction of time within some recent window of operations. The usage may be an average of samples taken over the window of time. The bus utilization may be monitored directly from the bus or from control logic in the memory access control logic 205. The bandwidth determination logic may include a programmable threshold register 202 to specify the usage ratio above which the memory bus is considered bandwidth limited and below which the memory bus is considered not to be bandwidth limited. The window of time may also be programmable. The bandwidth determination logic 201 provides an indication 206 of the existence of the bandwidth limited condition to memory access control logic 205. The memory access control logic 205 includes well-known functionality to provide the appropriate control signals and interface logic to retrieve data from main memory 107.

Alternatively, the bandwidth determination logic 201 monitors the request queue 203 to determine existence of the bandwidth limited condition. The request queue 203 queues up memory access requests to main memory 107. The depth of the queue indicates the memory bus usage. The deeper the queue, the higher the bus utilization and the more likely the memory bus is operating in a bandwidth limited condition. Certain embodiments do not distinguish reads and writes in the request queue and/or the bus usage monitor when evaluating bandwidth determination. In other embodiments, particularly those that use uni-directional signaling on the memory interface, the read data interface may be separate from the write data interface. In such a system, the bus bandwidth monitor or queue depth monitor may only need to look at reads.

Like the bus monitor embodiment, the threshold level of the queue depth that distinguishes a bandwidth limited condition from a non-bandwidth limited condition may be programmable in threshold register 202. The depth of the queue may be averaged over a predetermined or programmable window of time. Some embodiments may utilize both approaches to provide extra assurance as to whether the bandwidth limited operation condition exists.

In this description, data block Data1 represents a reduced-size data block corresponding to the size of a compressed data block. The combination of data blocks Data1 and Data2 represents a full-size, non-compressed data block. When the bandwidth adaptive memory controller is operating in a non-bandwidth limited mode, e.g., when the queue depth is below the threshold level and the bandwidth determination logic 201 provides that indication to memory access control logic 205, the memory access control logic, in one embodiment, has its block size indicator 207 set to indicate full access mode where a full-size, non-compressed data block (Data1 and Data2) is accessed. When the memory controller accesses full sized block (i.e., the memory controller isn't in a bandwidth-limited state), the resulting full-size block is examined to see if it is either compressed or uncompressed. If the block is uncompressed, the full-size block (data1+data2) that was returned from the main memory is returned to the requestor. If on the other hand, the block is compressed, the "data1" portion of the full-size data block returned from main memory is decompressed and returned to the requestor, while the data2 portion returned from the main memory is discarded.

When the bandwidth adaptive memory controller is operating in a bandwidth limited mode, e.g., when the queue depth is above the threshold level, the block size indicator 207 is set to indicate a compressed block size and the memory controller operates in compressed access mode in which a reduced-size data block, e.g., only Data1, is accessed in response to execution of the memory request. The compression check logic 209 checks the ECC bits (or other compression tags) to determine if the reduced size retrieved block was in fact compressed and the reduced-size block is stored in Data1 Temporary Storage 213. If the block was not in fact compressed, the compression check block communicates the need to access the remaining portion of the full-size block by placing a request into the Data2 Request Queue 215. The memory requests are serviced by the Memory Access Control logic 205 from the Data2 Request Queue. These requests are a fixed size regardless of the current Block Size setting. The Data2 data values retrieved from main memory are routed back to the Compression Check logic to be merged with the associated data from the Data1 temporary storage to form the full uncompressed result. Note that while Data2 Request Queue 215 is shown as a separate request queue in FIG. 2, it may be incorporated into request queue 203 in some embodiments.

Note that the approach described herein attempts to limit the latency downside of keeping "compressed/non-compressed" tag information stored with the data in main memory (which eliminates the need for large on-chip structures to hold or cache these tags indicating compression state), while maximizing the bandwidth-saving performance benefits of main memory compression when memory compression is most beneficial.

Figure 3:
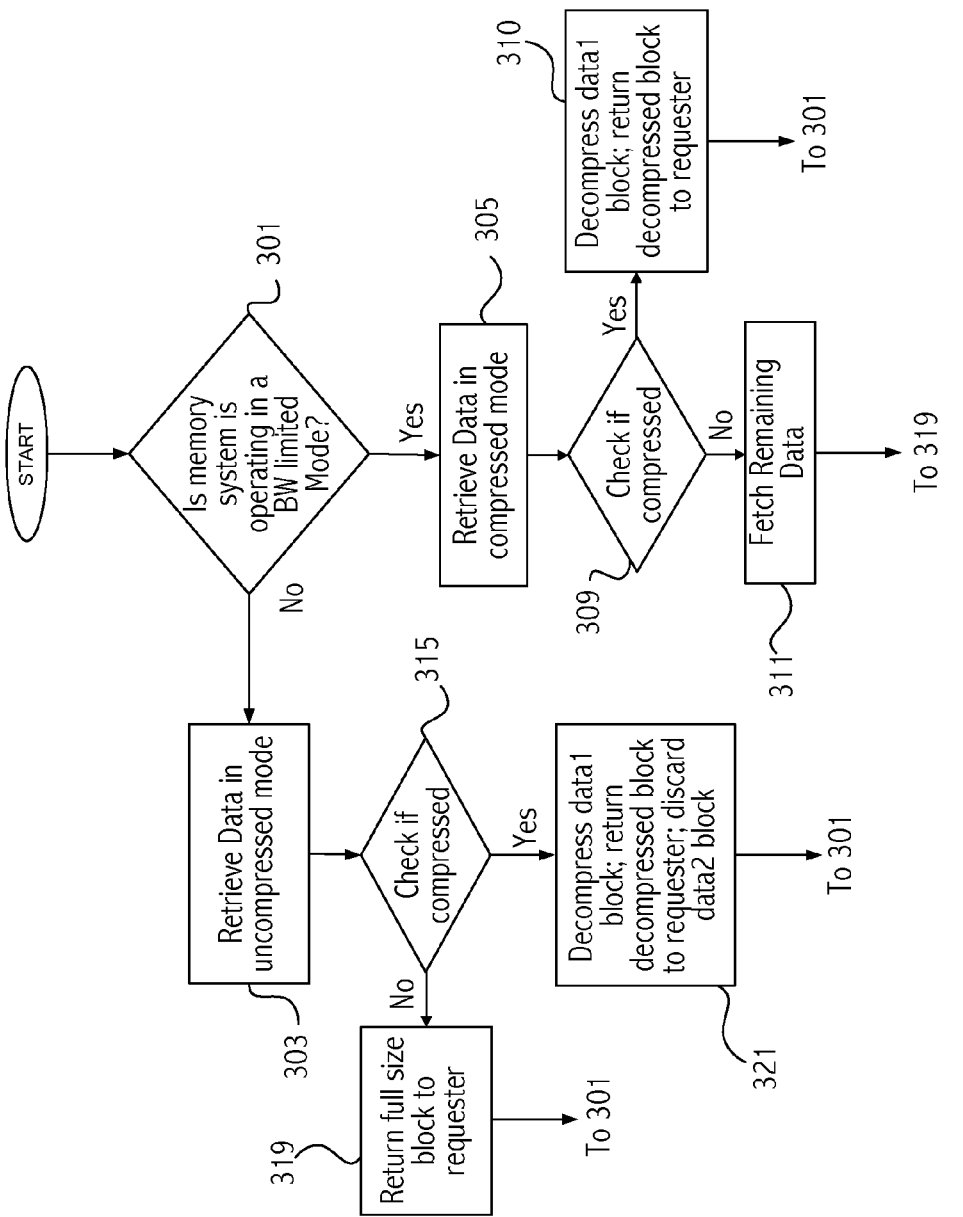
FIG. 3 illustrates a high-level flow diagram of an embodiment of the invention.

FIG. 3 illustrates an exemplary flow chart associated with the embodiments shown in FIGS. 1 and 2. In 301, the bandwidth determination logic 201 determines if the memory system is operating in a bandwidth limited mode. If not, data is retrieved in uncompressed mode (full-size block) in 303. When the memory controller accesses full sized block, the resulting full-size block is examined in 315 to see if it is either compressed or uncompressed. If the check in 315 indicates the block is uncompressed, the full-size block (data1+data2) that was returned from the main memory is returned to the requestor in 319 and the flow returns to 301. If on the other hand, the block is compressed, in 321 the "data1" portion of the full-size data block returned from main memory is decompressed and returned to the requestor, while the data2 portion returned from the main memory is discarded and the system returns to 301 waiting for the next memory access. If the system is operating in a bandwidth limited mode (Yes in 301), then the memory controller operates in compressed mode and retrieves a reduced-size memory block in 305. After retrieving the block, the memory controller reads the tag information associated with the memory block, e.g., examines the ECC bits, to determine if the block was, in fact, compressed in 309. If so, the memory controller decompresses the data1 block and returns the decompressed block to the requester in 310 and returns to 301 for the next memory access. If the block was uncompressed, the memory controller needs to perform another memory access to retrieve the remaining data that is required to form the full-size uncompressed block in 311, returns the full-size block to the requester in 319, and then returns to 301 for the next memory access. Note that in the flow of FIG. 3, multiple blocks of data may be read for any particular read request. Note that it may be possible for a read request to request multiple blocks of data, some of which are compressed. In an embodiment, when in bandwidth limited mode, for a request for several full-size blocks, first the memory controller reads the first reduced-size blocks (Data1) for each of the requested blocks, and then reads the conditional second reduced-size block (Data2) for each of the non-compressed blocks.

In an embodiment, when operating in the bandwidth-limited mode, it is possible and may be desirable for other unrelated memory requests to be issued between the first access for the reduced sized data block (Data1) and the (conditional) second access for the second reduced-sized data block (Data2) when the first access indicates that the block is not compressed. Thus, for example, when one or more requests enter request queue 203 prior to a request entering request queue 215 for a second reduced-size block, the one or more requests may be issued before the request in request queue 215 is issued.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and computer-readable medium having encodings thereon (e.g., HDL, Verilog, GDSII data) of such circuits, systems, and methods, as described herein. Computer-readable medium includes tangible computer readable medium e.g., a disk, tape, or other magnetic, optical, or electronic storage medium. In addition to computer-readable medium having encodings thereon of circuits, systems, and methods, the computer readable media may store instructions as well as data that can be used to implement the invention. Structures described herein may be implemented using software executing on a processor, firmware executing on hardware, or by a combination of software, firmware, and hardware.

The description of the invention set forth herein is illustrative, and is not intended to limit the scope of the invention as set forth in the following claims. For example, while various separate blocks were shown in FIG. 2 to illustrate the functionality of the memory controller, actual implementations may distribute the functionality differently and some of the functionality can reside in a location other than the memory controller. Variations and modifications of the embodiments disclosed herein, may be made based on the description set forth herein, without departing from the scope and spirit of the invention as set forth in the following claims.

What is claimed is:

1. A method comprising:
   retrieving data from memory in one of a compressed access mode and a full access mode according to whether a bandwidth limited condition exists in accessing the memory.

2. The method as recited in claim 1 further comprising determining whether the bandwidth limited condition exists according to traffic on a memory bus being above a predetermined threshold.

3. The method as recited in claim 1 further comprising determining whether the bandwidth limited condition exists according to a depth of a queue of memory access requests.

4. The method as recited in claim 1 wherein retrieving data in compressed access mode comprises retrieving a reduced-size data block from the memory.

5. The method as recited in claim 4 further comprising after retrieving the reduced-size data block, checking to see if the reduced-size data block is compressed from information retrieved with the reduced-size data block and if not compressed, retrieving remaining data from the memory to form a full-size data block.

6. The method as recited in claim 5 further comprising issuing memory requests unrelated to the reduced-size data block and retrieving unrelated data between retrieving the reduced-size data block and the remaining data to form the full-size data block.

7. The method as recited in claim 4 wherein retrieving data in full access mode comprises retrieving a full-size data block from the memory responsive to each request for a data block.

8. The method as recited in claim 7 further comprising storing information as to whether a block of data in the memory is compressed in the memory.

9. An apparatus comprising:
   bandwidth limited determination logic responsive to one or more memory system conditions to determine whether a bandwidth limited operating condition exists and to supply an indication thereof; and
   memory access control logic, responsive to the bandwidth limited determination logic, to retrieve data from the memory in compressed mode when the bandwidth limited operating condition is determined to exist by the bandwidth limited determination logic and to retrieve data from the memory in full access mode when the bandwidth limited operating condition is determined not to exist by the bandwidth limited determination logic.

10. The apparatus as in claim 9 wherein the memory access control logic retrieves the data in memory in compressed mode by accessing a reduced-size block of data for each block of data requested.

11. The apparatus as recited in claim 9 wherein a memory controller, which includes the bandwidth limited determination logic and the memory access control logic, is configured to check if the reduced-size block of data is actually compressed after retrieval, and to access a remaining data forming a full-size data block if the checking indicates that the reduced-size block of data is not compressed.

12. The apparatus as recited in claim 11 wherein the memory controller is configured to determine existence of the bandwidth limited operating condition according to usage of a memory bus coupled to the memory being greater than a predetermined threshold.

13. The apparatus as in claim 9 wherein the memory access control logic is configured to access data in full access mode by accessing a full-size block of data for each block of data requested.

14. The apparatus as recited in claim 9 further comprising a request queue containing memory bus requests and wherein the bandwidth determination logic is operable to determine existence of the bandwidth limited operating condition according to a depth of the request queue.

15. The apparatus as recited in claim 9 further comprising a memory controller including the memory access control logic and the bandwidth determination logic and at least one of a central processing unit and a graphics processing unit coupled to the memory controller.

16. A method comprising:
   determining whether a memory system is operating in a bandwidth limited mode;
   responsive to the memory system operating in the bandwidth limited mode, accessing data from memory in a compressed access mode; and responsive to the memory system not operating in the bandwidth limited mode, accessing data from memory in uncompressed mode.

17. The method as recited in claim 16 wherein accessing data in uncompressed mode comprises accessing the data as full-size data blocks and accessing data in compressed mode comprises accessing data in reduced-size data blocks.

18. The method as recited in claim 16 wherein a memory controller determines whether the memory system is in the bandwidth limited mode.

19. The method as recited in claim 16 further comprising determining if the memory system is operating in the bandwidth limited mode according to whether utilization of a memory bus exceeds a predetermined threshold.

20. The method as recited in claim 16 further comprising determining if the memory system is operating in the bandwidth limited mode according to whether a depth of a queue of memory requests exceeds a predetermined threshold.

21. The method as recited in claim 16 further comprising determining if the memory system is operating in the bandwidth limited mode according to whether utilization of a memory bus exceeds a predetermined threshold and according to whether a depth of a queue of memory requests exceeds a predetermined threshold.

* * * * *